United States Patent [19]

Yanov et al.

[11] Patent Number: 4,738,136
[45] Date of Patent: Apr. 19, 1988

[54] COUPLING FOR LIQUID METERS

[75] Inventors: David A. Yanov, Monroeville; Johann A. Stamm, Export; Ray Sutherland, Hopwood, all of Pa.

[73] Assignee: Rockwell International Corporation, Pittsburgh, Pa.

[21] Appl. No.: 923,453

[22] Filed: Oct. 27, 1986

Related U.S. Application Data

[63] Continuation of Ser. No. 830,043, Feb. 18, 1986, abandoned, which is a continuation of Ser. No. 584,040, Feb. 27, 1984, abandoned.

[51] Int. Cl.$^4$ ............................................. G01F 15/14
[52] U.S. Cl. ...................................................... 73/273
[58] Field of Search ................................. 73/253–258, 73/273, 274, 431

[56] References Cited

U.S. PATENT DOCUMENTS 4,391,139  7/1983  Sutherland et al. .................. 73/273
4,422,325 12/1983  Sutherland et al. .................. 73/273

Primary Examiner—Ivars Cintins

[57] ABSTRACT

An improved drive post and dog arrangement for transferring the motion of the piston in an oscillating piston meter from the piston to the exterior of the measuring chamber whereby the noise produced by repeated disengagement and re-engagement of the drive post and dog is reduced.

4 Claims, 2 Drawing Sheets

COUPLING FOR LIQUID METERS

This application is a continuation of application Ser. No. 830,043, filed 2/18/86, which is a continuation of application Ser. No. 584,040 filed 2/27/84, both now abandoned.

BACKGROUND OF THE INVENTION

1. Field of the Invention

This invention relates to liquid meters, and in particular, to the means whereby the motion of the flow responsive element is transferred from the moving element to the register.

2. Description of the Prior Art

Liquid meters of the type with which the instant invention is particularly concerned are known as oscillating piston meters, a typical example of which are show in U.S. Pat. Nos. 2,449,974 dated Sept. 28, 1948, and 4,391,139 dated July 5, 1983. As particularly shown in the latter patent, the meter is generally comprised of a casing which encloses a measuring chamber which in turn contains an oscillating piston as the flow responsive element. A register is also provided exterior to the measuring chamber. Means must therefore be provided to transmit the motion of the oscillating piston to the exterior of the measuring chamber so that the motion may be fed into the register to show the volume of liquid which has flowed through the meter. A conventional method of transmitting the motion of the oscillating piston to the exterior of the measuring chamber is to provide a drive post extending from the piston which engages a drive dog which in turn is mounted for rotation within the measuring chamber on one end of a shaft which is journaled for rotation in the top wall of the measuring chamber. The other end of the shaft protrudes exteriorly of the measuring chamber and carries means to drive couple it to the register mechanism. It has been found, however, that a problem arises with the use of the post-dog drive arrangement of such prior art devices. As the piston oscillates under the influence of liquid flowing through the meter, the velocity of the piston is not uniform throughout its cycle of oscillation. In other words, the instantaneous velocity of a point on the piston will vary depending on what point in the cycle of oscillation the piston is at. This nonuniformity of velocity of the piston causes the post and dog to repeatedly disengage and re-engage as the piston oscillates. Each time the post re-engages the dog, it does so with an impact, the energy of impact being dissipated over a relatively small area because of the essentially line contact between the cylindrically shaped post and the planar contact surface of the dog. These repeated impacts produce a high level of noise which emanates from the meter. This noise is particularly loud and noticable when the meter parts are made from plastic and in such meters, the level of noise may be objectionable, particularly when water meters are installed in residences.

SUMMARY OF THE INVENTION

In order to substantially reduce the noise level attendant upon the use of such prior art drive arrangements, Applicants have provided a post-dog configuration in which the shape of the area on the dog which is contacted by the post is made to conform substantially to the shape of the post so that a large area of contact is provided between the post and the dog. Such an arrangement not only dissipates the energy over a wider contact area, but as the parts approach the point of re-engagement, a significant volume of liquid must be squeezed out of the space between the post and the dog before contact can be made which tends to cushion the impact of re-engagement. Similarly, the dog does not tend to lose contact with the post as easily because a volume of liquid must be pulled into the space between the dog and post as the two disengage. Thus, the complimentarily shaped dog and post result in multiple effects which combine to significantly reduce the level of noise.

DESCRIPTION OF THE PREFERRED EMBODIMENT

Figure 1:
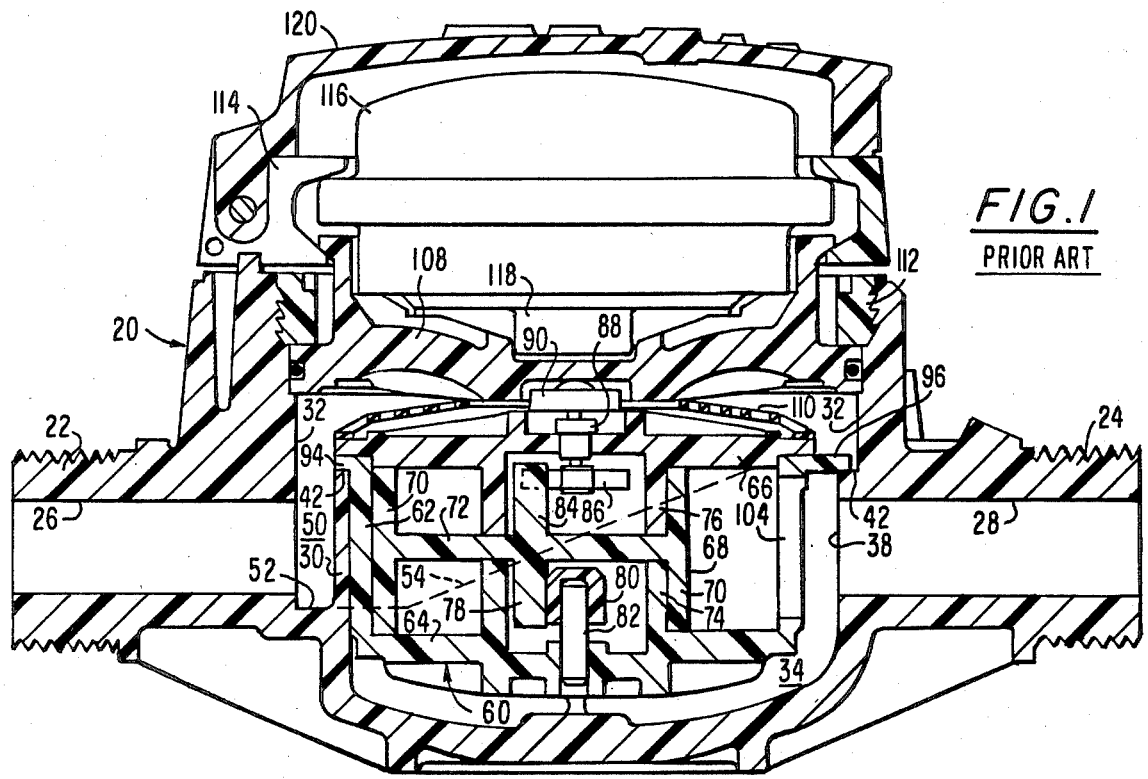
FIG. 1 is a cross sectional elevation view of an oscillating piston type water meter such as is disclosed in U.S. Pat. No. 4,391,139 employing a conventional post-dog drive arrangement.

Referring particularly to FIG. 1, the meter is comprised of a generally hollow main case 20, the interior of which opens upwardly. Inlet and outlet spuds 22 and 24 formed on opposite sides of the main case have inlet passage 26 and outlet passage 28 respectively extending through the spuds to communicate with the interior of the main case 20. Wall 30 is generally circular in form and concentric with the interior wall 32 of the main case, except that at the outlet end of the case 20, the wall 30 converges towards wall 32 to form a wall portion 38 at the outlet of the main case at a distance from the center of the main case somewhat greater than the radius of the circular portion of the wall 30. The space within the walls 30 and 38 define a measuring chamber compartment 34. Seating surface 42 is formed on the tops of walls 30 and 38 to provide a continuous seating surface on which the measuring chamber is seated.

An inlet chamber 50 which is in communication with the inlet passage 26 is defined between walls 30, 32, bottom wall 52 and diametrically opposed inclined ramps, one of which is shown in dotted line 54 in FIG. 1. These ramps 54 merge at one end with the bottom wall 52 of the inlet chamber 50 and at other end with seating surface 42.

Figure 2C:
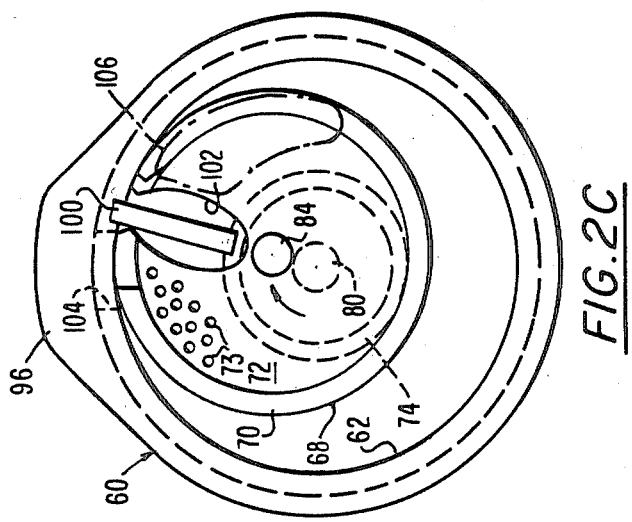
FIGS. 2A, 2B and 2C are top plan views of the measuring chamber with its top cover removed and showing the oscillating piston therein in several different positions as it progresses through its cycle of oscillation.
Figure 2B:
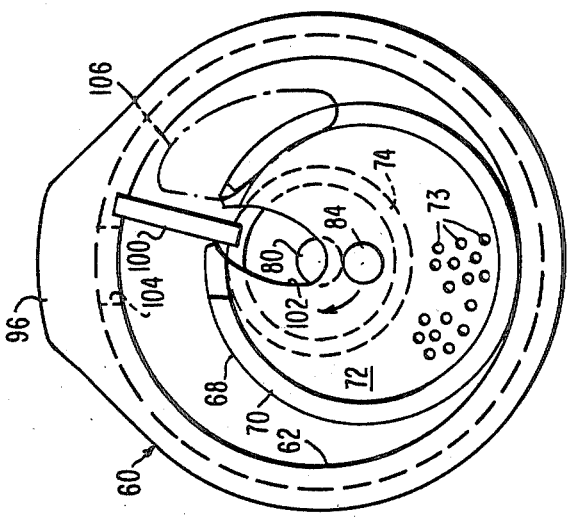
Figure 2A:
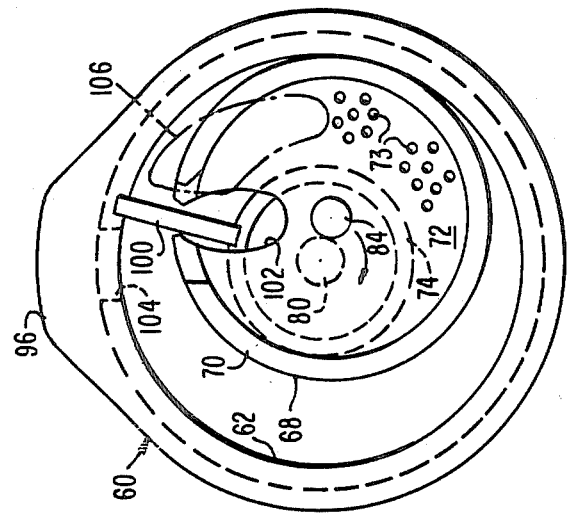

A measuring chamber identified generally by the numeral 60 is received within compartment 34 comprised of side walls 30 and 38 and has a cylindrical side wall 62, a bottom wall 64 and removable top wall 66. An oscillating piston 68 within the measuring chamber 60 is comprised of the circular wall 70 and a horizontal wall 72 midway between the vertical extremities of wall 70. Openings 74, only a few of which are shown in FIGS. 2A, 2B and 2C are uniformly distributed in and extend through wall 72 to connect the spaces above and below the wall 72. A cylindrical guide wall 74 projects upwardly from the bottom wall 64 within the confines of the wall 70 and within the space beneath wall 72 of the oscillating piston. Similarly, a cylindrical guide wall 76 projects downwardly from the central portion of the top wall 66 of the measuring chamber and extends within the confines of the wall 70 in the space above the wall 72. A guide pin 78 of circular cross section projects downwardly from the wall 72 and is in guiding contact with bushing 80 on pin 82 which projects upwardly from the center of the bottom wall 64.

A drive post 84 projects upwardly from the wall 72 and is adapted to engage a drive dog 86 mounted for rotation at the lower end of a bushing and shaft assembly 88 which extends through the top wall 66 of the measuring chamber. At the other extremity of the bushing assembly 88, which is outside the measuring chamber, a driver magnet 90 is mounted for concommitant rotation with the drive dog 86.

A downwardly facing circumferential lip 94 is formed around the top of the vertical wall 62 of the measuring chamber and has a projecting portion 96 formed near the outlet portion of the measuring chamber. The bottom surfaces of the lip 94 and projection 96 form a continuous seating surface which seats on the seating surface 42 on the walls 30 and 38. Thus, when the bottom surface of lip 94 and projection 96 are firmly seated on surface 42, the inlet chamber 50 is sealed from the measuring chamber compartment 34 which may be considered an outlet chamber since it communicates with directly with outlet passage 28.

Referring to FIGS. 2A, 2B and 2C, a division plate 100 extends radially between wall 62 and guide wall 74 and vertically (FIG. 1) between the bottom wall 64 and top wall 66 of the measuring chamber. The division plate 100 projects into an opening 102 in horizontal wall 72 to a varying extent depending on the position of the piston in its cycle. It will be understood that the opening 102 accomodates the movement of the piston relative to the division plate. Outlet 104 is formed in the wall 62 of the measuring chamber adjacent to the division plate to provide an outlet for the flow of liquid from the interior of the measuring chamber into chamber 34 and outlet 28 in the main case. The inlet to the interior of the measuring chamber is through top wall 66 and its relative position is shown in dotted line 106 in FIGS. 2A, 2B and 2C which show the oscillating piston 68 in several different positions as it oscillates throughout one cycle of oscillation.

Referring to FIG. 1, a pressure plate 108 is sealingly received in the interior of the main case 20 and is held in place by a retaining ring 112 threaded into the interior of the main case above the pressure plate. A strainer 110 is compressed between the top wall 66 of the measuring chamber and the pressure plate and serves to bias the measuring chamber against the sealing surface 42 as well as to strain foreign material from the liquid before it enters the measuring chamber. A split clamp ring 114 serves to clamp a register mechanism 116 against the top of the pressure plate 108. Cover 120 is pivotally secured to clamp ring 114 to provide protection for the register. The register has a well portion which depends from the bottom and contains a magnet which is magnetically coupled to driver magnet 90 so as to drive the mechanism within register 116 as the piston 68 oscillates under the influence of liquid flow.

Referring now to FIGS. 1, 2A, 2B and 2C, liquid enters the meter through inlet 26 and flows into inlet chamber 50, through strainer 110 and into the interior of the measuring chamber through the inlet opening 106 in the top wall 66 of the measuring chamber. As shown in FIGS. 2A–2C, the piston oscillates in a clockwise direction about bushing 80. FIG. 2A shows the position of the piston as it begins a cycle and as the water flows through the inlet 106, it reacts against the piston to force the piston in a clockwise oscillating motion. In its motion, the piston is guided by the coacting contact between depending pin 78 and the bushing 80, and by the coacting contact between the interior of wall 70 and the exterior of the quide walls 74 and 76. In FIG. 2B, the piston is shown in a position which is approximately midway through a cycle of oscillation and it can be seen that the space to the right of the division plate 100 between the piston and the interior of the measuring chamber is expanding while the space to the left of the division plate between the piston and the interior of the measuring chamber is decreasing. Thus, liquid is flowing into the first-mentioned space while liquid is flowing out of the second-mentioned space and out of the measuring chamber through opening 104 into outlet chamber 34 and outlet passage 28. It will be appreciated that as the piston oscillates in a clockwise direction, the drive post 84 orbits about bushing 80, the center line of which is co-axial with the axis about which the dog 86 rotates.

FIG. 2C shows the position of the piston after the piston and the drive post 84 has orbited to a position approximately 180° displaced from that shown in 2B. As the drive post 84 orbits, it drives the dog 86 which in turn through bushing and shaft assembly 88, causes the driving magnet 90 to rotate. A driven magnet within well portion 118 which is magnetically coupled to magnet 90 is thereby driven to drive the mechanism within the register to provide an indication of the volume of flow to the meter.

It has been found that the velocity at which the piston and the post 84 move is not uniform throughout a cycle of oscillation. As the piston passes through the position shown in FIG. 2C, the velocity of the piston is greatest and as it passes through the position shown in FIG. 2B, its velocity is at its lowest value. The difference in velocity in those two positions may be in the order of twenty percent. The dog 86 and the mechanism driven by it, that is, the magnet 90 and the driven magnet and mechanism within the register 116 has a certain amount momentum. Therefore, when the drive post 84 decelerates as it approaches the position shown in FIG. 2A, it will become disengaged from the dog 86 because the dog and the mechanism driven by it tend to continue at a uniform velocity. As it proceeds on to the position shown in FIG. 2C, the velocity of the piston and drive post will increase causing the post to re-engage the the dog with a considerable impact. Since the piston oscillates rapidly through many cycles per minute when liquid is flowing through the meter, the post and dog disengage and re-engage many times per minute.

Figure 3A:
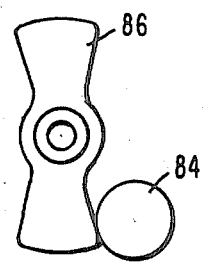
FIG. 3A is a top plan view of the conventional prior art post-dog drive arrangement of FIG. 1.

FIG. 3A shows a plan view of the dog 86 which is conventional in the prior art. Since the contact area between the cylindrically shaped post and the planar contact surface of the dog is essentially a line contact, the area available to dissipate the energy of impact upon re-engagement is very small. This condition, when repeated in rapid succession many times a minute, results in an objectionable level of noise generated by the meter.

Figure 4A:
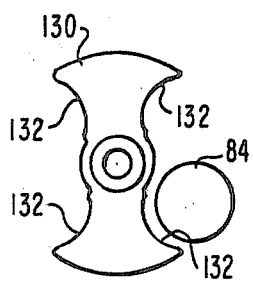
FIG. 4A is a top plan view of the post-dog arrangement of the instant invention at a point just before engagement of the post and dog.
Figure 4B:
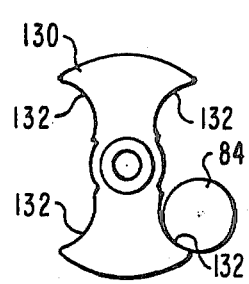
FIG. 4B is a top plan view of the post-dog arrangement of the instant invention at the point of engagement of the post with the dog.
Figure 4C:
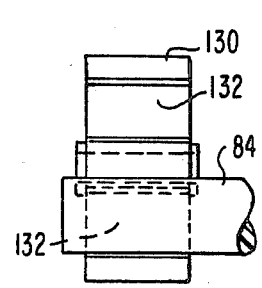
FIG. 4C is a view from the right of Figure B.

As a means of reducing the noise produced by the prior art drive post-dog arrangement, Applicants have provided the dog shown in FIGS. 4A, 4B and 4C in which the area of contact between the post and dog is greatly enlarged. Referring to FIGS. 4A and 4B, Applicants' dog designated by numeral 130 has pockets 132 which have a shape which is complimentary to the arc of curvature of the surface of post 84. In other words, the arc of curvature of the pockets have the same radius as the cylinrical post. FIG. 4A shows the relative positions of the dog 130 and post 84 as the two parts approach re-engagement. It will noted that due to the complimentary shape of the pockets 132 and 84, a layer of liquid is temporarily entrapped between the post and the pockets 132 which must be forced out of the space between the dog and the pockets before contact can be made. Thus, the film or layer of liquid between the dog and post as they approach re-engagement cushions the impact of re-engagement. Moreover, when the two parts do reach the point of re-engagement as shown in FIG. 4C, the area of contact is greatly enlarged whereby the energy of the impact on re-engagement is dissipated over a much larger area.

Applicants' invention also operates to reduce noise by inhibiting the disengagement of the post and dog which reduces the energy to be dissipated upon impact. Just as a volume of liquid must be forced out of the space between the dog and post before engagement, similarly, a volume of liquid must be drawn into the space between the dog and post before my appreciable disengagement can take place.

Figure 3B:
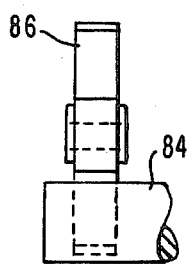
FIG. 3B is a view from the right of FIG. 3A.

Disengagement is also inhibited by the increased thickness of Applicants' dog as compared to the thickness of dog 86. From a comparison of FIGS. 3B and 4C, it can be seen that Applicants' dog 130 is considerably thicker than dog 86. In practice, dog 130 is approximately three times thicker than dog 86. Since the dog is rotating in liquid, the increased thickness tends to more rapidly decrease the velocity at which the dog 130 rotates after it has been disengaged from the post 84. This further reduces the distance by which the two parts are disengaged and further decreases the energy of impact to be dissipated upon re-engagement.

In summary, the invention herein described operates in four ways to reduce the level of noise produced by the flow of liquid through an oscillating piston meter: (1) the complimentary configuration of the post and dog increases the area of contact over which the energy of impact is dissipated; (2) the volume of liquid momentarily entrapped between the post and dog as they approach the point of re-engagement cushions the impact; (3) disengagement is inhibited by the fact that a volume of liquid must be drawn into the post-dog region before disengagement can be fully established; and (4) disengagement is further inhibited by the increased viscous drag on the dog as a result of its increased thickness.

We claim:

1. A liquid meter comprised of a casing containing a flow responsive element responsive to the flow of liquid through said meter, a drive coupling within said casing comprised of a drive post mounted for movement concomitant with said flow responsive element and having a convex contact surface, and a driven element mounted for rotation within said casing and having a concave contact surface adapted to be engaged by the contact surface of said drive post, the contact surface of said driven element having an arc of curvature which is essentially complementary to the arc of curvature of the contact surface of said drive post to provide a substantial area of contact between said drive post and said drive element.

2. The meter defined in claim 1 in which the drive post has a cylindrical shape and the contact area of said driven element is shaped to conform substantially to the shape of said drive post.

3. The meter defined in claim 1 together with a register mechanism and further coupling means to couple said driven element with said register mechanism.

4. A liquid meter comprised of a casing containing a flow responsive element responsive to the flow of liquid through the meter, a drive coupling within said casing comprised of a drive means movable concomitantly with said flow responsive element, said drive means having a first contact surface, and a driven means mounted within said casing and having a second contact surface adapted to be engaged by said drive means first contact surface, said first and second contact surfaces being configured to provide substantial areal contact therebetween and to require a quantity of water to be removed gradually from between said contact surfaces as they approach each other, respectively, and cushion the force of contact therebetween.

* * * * *